Patented Oct. 5, 1943

2,330,846

UNITED STATES PATENT OFFICE 2,330,846

SPERMICIDE

Frank V. Sander, Highland Park, N. J., assignor to Ortho Products, Inc., Linden, N. J., a corporation of New Jersey No Drawing. Application May 1, 1939, Serial No. 271,159

4 Claims. (Cl. 167—58)

This invention is related to topical remedies mainly intended for application to mucous surfaces such as in the treatment of the vaginal cavity, and it comprises an acid spermicide as hereinafter more particularly described.

I have discovered that fatty acid compounds obtained from animal and vegetable fats and oils as by saponification and neutralization with mineral or organic acids, possess distinct spermicidal activity with negligible, if any, irritational characteristics. The higher fatty acids in the unsaturated state exhibit greater spermicidal activity and when held in suspension in finely dispersed particles or droplets, which appear oily in the descriptive sense, in suitable vehicles or diluents are practically immediate in their spermicidal action. This immediate action is a desired characteristic of an effective spermicide. Under the practice of my invention, the acids are employed in a higher concentration than is necessary for saturation of the diluent or vehicle and hence a compound is formed containing an excess of the fatty acids.

Such unsaturated higher fatty acids (and higher in this field is generally considered to be such acids having carbon chains of ten or more carbon atoms) or mixtures thereof when derived from olive oil, coconut oil, castor oil, linseed oil, other oils, animal fats, etc., include principally as is well recognized in chemical literature such acids as oleic, ricinoleic, ricinolenic, linoleic, and linolenic acids.

I further have discovered that better dispersion and finer division of the acids can be obtained by incorporating surface tension depressors. It is believed that the desired rapidity of action requires such acids to be in such fine state of dispersion and division that increments or particles thereof are smaller than the heads of the sperm and contact, or possibly penetrate into, the body of the sperm at a multiplicity of points. Such depressors, functioning also as dispersing agents, may be selected from sulfonated high fatty acids and alcohols, and salts and esters thereof, such as sulfonated lauryl alcohol, sulfonated myristyl alcohol, sulfonated castor oil, etc. These examples are by way of illustration and not of limitation.

Of the higher fatty acids mentioned, oleic and ricinoleic acids have been found to be the most practical because of availability and most effective in spermicidal activity.

A typical composition for association with the spermicidal medicine of my invention may be prepared as follows:

A. Dissolve 0.8 oz. para-hydroxy-benzoic acid propyl ester in 70 lbs. of hot water. Cool to 170° F. and add slowly while stirring well 3 lbs. powdered locust bean gum. Stir until thick and allow to stand until gum is conditioned (one to three days). Add 3 lbs. powdered boric acid and stir will for 15 minutes.

B. Add 1 lb. potassium oleate (80%) and 0.6 lb. of a disperser or a surface tension depressor, such as sulfonated myristyl alcohol, to 10.5 lbs. glycerine diluted with 8 lbs. of water. Heat until a clear mixture is obtained.

With good stirring add B to A in a slow stream and stir for 15 minutes. Adjust pH to approximately 4.6 by the addition of about 4 oz. glacial acetic acid dissolved in 3 lbs. water. Stir for 15 minutes. Add 0.8 oz. perfume and 0.4 oz. oxyquinoline sulfate dissolved in 0.5 lb. water. Stir for 1 hour. Adjust weight to 100 lbs. and pH to 4.6 if necessary.

It is to be understood that the foregoing is simply by way of illustration and that the compositions and proportions may be varied within wide limits. For example, the locust bean gum, or vehicle for the spermicide, may be replaced by tragacanth, Irish moss, Indian gum, alginates, stearic acid, acacia, other vegetable gums cream bases, etc.; the potassium oleate may be replaced by potassium salts derived from castor oil or by other alkali salts or other acids showing definite spermicidal efficiency derived from oils and fats of the kind hereinbefore indicated. The macteriostatic agent, oxyquinoline sulfate, may be replaced by, for example, phenols or cresols, chlorinated phenols or chlorinated cresols, thymol or chlorinated thymol, phenyl phenols, etc. The surface tension depressor or dispersing agent may be replaced by other substances of like action such as, for example, sulfonated lauryl alcohol, sulfonated myristyl esters, naphthalene sulfonic acid, sulfonated castor oil sulfonated olive oil, and other agents of known and recognized surface tension depressor action.

The use of para-hydroxy-benzoic acid is not essential but is preferred because when present it serves to prevent molding of the gum.

The boric and acetic acids react with the alkali salt to release the acid spermicide. If free acid is used instead of the alkali salt, then only sufficient acetic acid is used to effect the desired pH.

The glycerine prevents dehydration of the vehicle.

Having described the invention, what is claimed as new:

1. A spermicide comprising ricinoleic acid derived from castor oil and suspended in a vehicle in finely dispersed particle resembling oily droplets.

2. A spermicide comprising ricinoleic acid in an aqueous vehicle and a surface tension depressant, said ricinoleic acid being suspended in a vehicle in finely dispersed particles.

3. A spermicide compriisng an unsaturated higher fatty acid dispersed in an aqueous vehicle including a surface tension depressor having pronounced dispersing properties whereby the acid is highly dispersed in the form of fine particles.

4. A spermicide comprising unsaturated higher fatty acids derived from castor oil dispersed in an aqueous vehicle including a surface tension depressor having pronounced dispersing properties whereby the acids are highly dispersed in the form of fine particles.

FRANK V. SANDER.

CERTIFICATE OF CORRECTION.

Patent No. 2,330,846.                            October 5, 1943.

FRANK V. SANDER.

It is hereby certified that error appears in the printed specification of the above numbered patent requiring correction as follows: Page 1, second column, line 12, for "will" read --well--; line 32, after "gums" insert a comma; line 38, for "macteriostatic" read --bacteriostatic--; line 47, after "oil" first occurrence, insert a comma; page 2, second column, line 3, for "compriisng" read --comprising--; and that the said Letters Patent should be read with this correction therein that the same may conform to the record of the case in the Patent Office.

Signed and sealed this 30th day of November, A. D. 1943.

(Seal)                                Henry Van Arsdale,
                                       Acting Commissioner of Patents.

DISCLAIMER 2,330,846.—*Frank V. Sander*, Highland Park, N. J. SPERMICIDE. Patent dated Oct. 5, 1943. Disclaimer filed July 19, 1946, by the assignee, *Ortho Pharmaceutical Corporation*.

Hereby enters this disclaimer to claim 1 in said specification.

[*Official Gazette August 20, 1946.*]